United States Patent [19]

Wade et al.

[11] 4,454,717
[45] Jun. 19, 1984

[54] RESERVOIR FOR A VEHICLE POWER STEERING SYSTEM

[75] Inventors: Philip M. Wade; Robert T. Williams, both of Huddersfield, England

[73] Assignee: David Brown Tractors Ltd., Huddersfield, England

[21] Appl. No.: 203,198

[22] Filed: Nov. 3, 1980

[30] Foreign Application Priority Data

Nov. 17, 1979 [GB] United Kingdom ............... 7939867

[51] Int. Cl.³ .................................... F16D 31/02
[52] U.S. Cl. .................................... 60/453; 137/574; 137/576; 137/592
[58] Field of Search ............ 137/592, 574, 576; 60/453

[56] References Cited

U.S. PATENT DOCUMENTS

| | | | |
|---|---|---|---|
| 2,733,662 | 2/1956 | Hunter | 60/453 X |
| 3,130,548 | 4/1964 | Hunt | 60/453 X |
| 3,638,676 | 2/1972 | Burch | 137/592 X |
| 4,144,947 | 3/1979 | Withers | 60/492 X |

Primary Examiner—Harold W. Weakley

[57] ABSTRACT

In a power steering system, for a vehicle, including a reservoir, an engine-driven pump, a double-acting hydraulic piston-and-cylinder assembly and a steering-wheel-operated hydrostatic steering unit which can function as a manually-operated emergency steering pump, sufficient oil for emergency operation of the hydrostatic steering unit must be retained in the system if the connection between the outlet of the engine-driven pump and the inlet of the hydrostatic steering unit should fracture. The reservoir accordingly comprises an outer casing adapted to breath air at its upper end and having an outlet at its lower end adapted to communicate with the inlet of the engine-driven pump, and an inner casing having a port at its lower end adapted to communicate with a port of the hydrostatic steering unit and an oil outlet at its upper end communicating with the interior of the outer casing.

8 Claims, 1 Drawing Figure

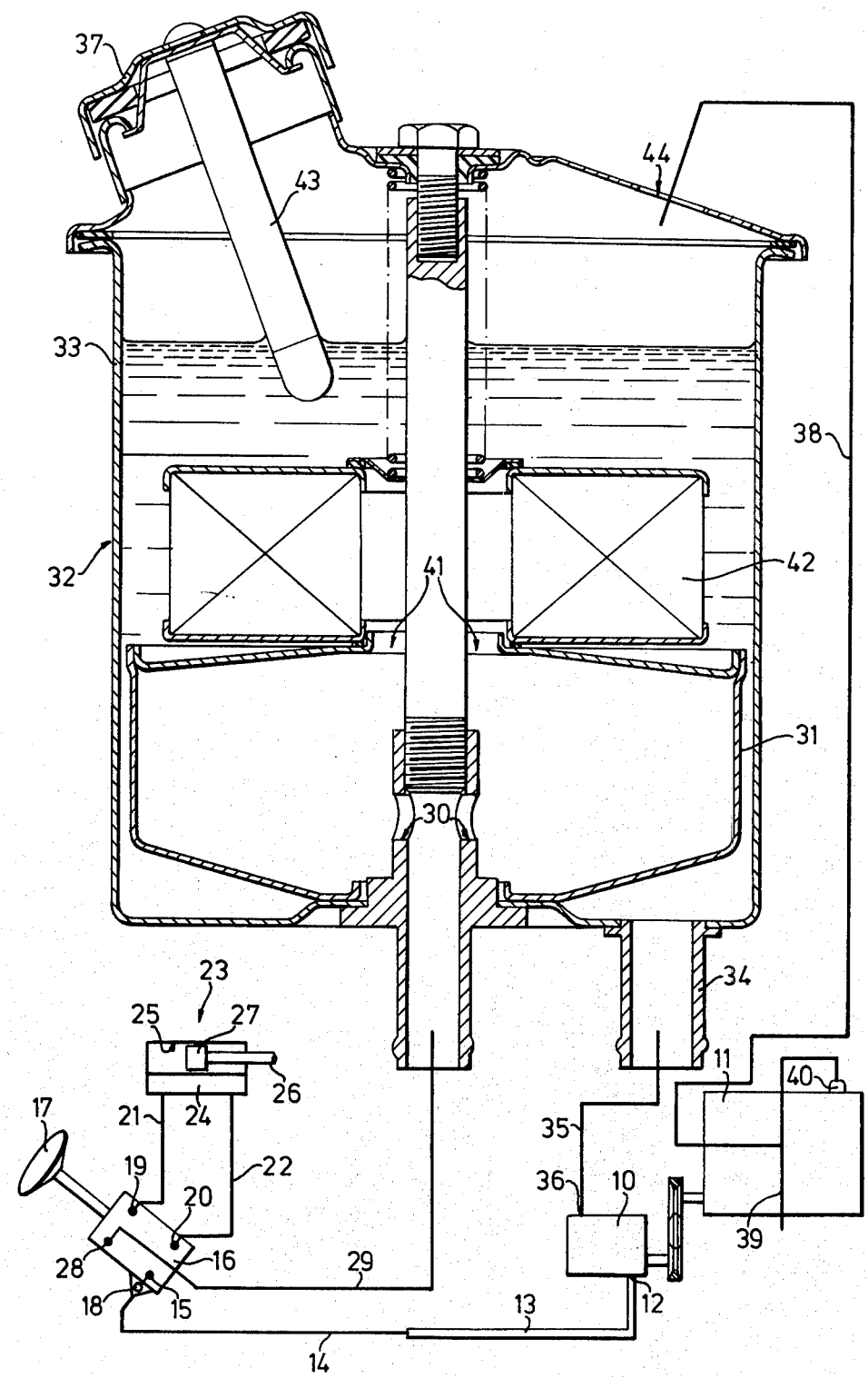

RESERVOIR FOR A VEHICLE POWER STEERING SYSTEM

BACKGROUND OF INVENTION

The invention relates to a reservoir for a power steering system, for a vehicle, of the type including an engine-driven pump circulating oil through a steering-wheel-operated hydrostatic steering unit which communicates with a double-acting hydraulic piston-and-cylinder assembly and can function in known manner as a manually-operated emergency steering pump if its supply of oil from the engine-driven pump fails, the reservoir being adapted to communicate with a port of said unit and with the inlet of the engine-driven pump.

The object of the invention is to ensure that sufficient oil to enable the hydrostatic steering unit to function as a manually-operated emergency steering pump is retained in the system in the event of fracture of the pipework connecting the outlet of the engine-driven pump to the inlet of said unit.

SUMMARY OF INVENTION

According to the invention, a reservoir for a power steering system, for a vehicle, of the type referred to comprises an outer casing adapted to breath air at its upper end and having an outlet at its lower end adapted to communicate with the inlet of the engine-driven pump, and an inner casing having a port at its lower end adapted to communicate with the aforementioned port of the hydrostatic steering unit and an oil outlet at its upper end communicating with the interior of the outer casing.

BRIEF DESCRIPTION OF DRAWING

A preferred embodiment of the invention will now be described, by way of example, with reference to the accompanying drawing which is a sectional side elevation of a reservoir for a tractor power steering system with the remainder of the system shown diagrammatically.

DESCRIPTION OF PREFERRED EMBODIMENT

Referring now to the drawing, a power steering system for a tractor includes a pump 10 driven by the tractor's engine 11 and having an outlet pipe 12 communicating by way of pipework consisting of an expandable hose 13 in series with a pipe 14 with a port 15 of a known hydrostatic steering unit 16 operated by the tractor's steering wheel 17. The pump 10 incorporates a maximum pressure relief valve (not shown), and the port 15 incorporates a non-return valve 18. The expandable hose 13 is provided to damp out pump delivery fluctuations and associated noise. The unit 16 comprises feed-back controlled metering valve means and can function as a manually-operated emergency steering pump. Said unit has ports 19 and 20 communicating by way of respective pipes 21 and 22 with a double-acting hydraulic piston-and-cylinder assembly indicated generally at 23 and with associated valve means 24 in accordance with our U.S. Pat. No. 4,144,947, the internal diameter of the cylinder 25 being 2 times the external diameter of the piston-rod 26 so that the effective area of one end-face of the piston 27 is twice that of the other. The piston-and-cylinder assembly 23 is operatively connected to steer the tractor's front wheels (not shown).

A port 28 of the unit 16 communicates by way of a pipe 29 with a port 30 opening into the lower end of an inner casing 31 of a reservoir indicated generally at 32 and disposed above the hydrostatic steering unit 16. The reservoir 32 has an outer casing 33 provided at its lower end with an outlet 34 which communicates by way of a pipe 35 with the inlet 36 of the pump 10, and at its upper end with a sealed filler cap 37 incorporating a dipstick 43 and with a hole 44 communicating with one end of an air breather pipe 38 the other end of which communicates with the outlet pipe 39 of the engine's crankcase breather 40, the pipe 39 providing a convenient source of solid-particle-free air. The inner casing 31 has an oil outlet 41 at its upper end which communicates with the interior of the outer casing 33 by way of an annular full-flow oil filter 42.

During normal operation, whilst the path taken by the tractor remains unchanged, the piston-and-cylinder assembly 23 is inoperative and oil is circulated by the pump 10 through the expandable hose 13, the pipe 14, the non-return valve 18, the hydrostatic unit 16, the pipe 29, the interior of the inner casing 31 of the reservoir 32, the filter 42, the interior of the outer casing 33 of the reservoir 32, and the pipe 35. The oil flows within the unit 16 from the port 15 to the port 28 thereof. When a change in the path taken by the tractor is initiated by turning the steering wheel 17 in either direction, oil is temporarily caused to flow within the unit 16 from the port 15 to the appropriate one of the ports 19 and 20 and from the other of said ports to the port 28, and the piston-and-cylinder assembly 23 and its associated valve means 24 operate as described in our aforementioned U.S. Pat. No. 4,144,947. That is to say, given equal angular movements of the steering wheel 17 in both directions, the tractor's front wheels are steered in the corresponding directions through equal angles and with substantially equal forces despite the unequal end-face areas of the piston 27.

If the pipework 13, 14 should fracture, the non-return valve 18 would close to prevent loss of oil from the hydrostatic steering unit 16 by way of the port 15, and the pump 10 would empty the interior of the outer casing 33 of oil but the inner casing 31 would remain full of oil to enable the unit 16 to function as a manually-operated emergency steering pump. In this event, when a change in the path taken by the tractor is initiated by turning the steering wheel 17 in one direction, oil is permitted to be drawn temporarily from the inner casing 31 through the pipe 29 to the port 28 of the unit 16 and thence is caused to flow to the port 19 and through the pipe 21 to that end of the cylinder 25 remote from the piston-rod 26. The supply of oil to said end of the cylinder 25 is augmented by oil being expelled from that end of the cylinder 25 containing the piston-rod 26 through the pipe 22 to the port 20 and thence to the port 19. Flow through the pipe 29 in the opposite direction to normal is possible due to the disposition of the reservoir 32 containing the inner casing 31 above the unit 16 and to the provision of the air breather pipe 38, the filter 42 being capable of passing air to the normal oil outlet 41 of the inner casing 31 to avoid a partial vacuum in said casing. When the steering wheel 17 is turned in the other direction, oil is drawn temporarily from that end of the cylinder 25 remote from the piston-rod 26 through the pipe 21 to the port 19, and half of it is caused to flow to the port 20 and thence through the pipe 22 to that end of the cylinder 25 containing the piston-rod 26 whilst the other half is caused to flow to the port 28 and thence in the normal direction through the pipe 29 to the interior of the inner casing 31, the expulsion of air from said interior to avoid a pressure build-up therein being permitted by the capability of the filter 42 to pass air from the normal oil outlet 41 and by the provision of the air breather pipe 38. The operating feature referred to in the last sentence of the preceding paragraph is thus maintained.

In a modification, the air breather pipe has an oil separator interposed in it at a point above the outer casing and communicates with some other source of solid-particle-free air, for example the downstream side of an air cleaner for the air induced by the engine's inlet manifold. In another modification, the filter is located elsewhere in the system, for example being interposed between the port opening into the lower end of the inner casing and the interior of said casing.

We claim:

1. A reservoir for a power steering system, for a vehicle, of the type including an engine-driven pump circulating oil through a steering-wheel-operated hydrostatic steering unit which communicates with a double-acting hydraulic piston-and-cylinder assembly and can function in known manner as a manually-operated emergency steering pump if its supply of oil from the engine-driven pump fails, the reservoir being disposed above the hydrostatic steering unit and adapted to communicate with a port of said unit and with the inlet of the engine-driven pump and comprising an outer casing adapted to breathe air at its upper end and having an outlet at its lower end adapted to communicate with said inlet, and an inner casing for retaining oil for emergency operation having a port at its lower end adapted to be connected in reversible flow communication with said port of said unit and an oil outlet at its upper end communicating with the interior of the outer casing.

2. A reservoir according to claim 1, containing an oil filter.

3. A reservoir according to claim 2, wherein the filter is a full-flow filter disposed between the outlet of the inner casing and the interior of the outer casing.

4. A reservoir according to claim 1, claim 2 or claim 3, wherein the outer casing is adapted to communicate at its upper end with a source of solid-particle-free air.

5. A reservoir according to claim 4, wherein said source is the outlet pipe of the engine's crankcase breather.

6. A power steering system, for a vehicle, comprising an engine-driven pump; a steering-wheel-operated hydrostatic steering unit through which the pump circulates oil and which can function in known manner as a manually-operated emergency steering pump if its supply of oil from the engine-driven pump fails; a double-acting hydraulic piston-and-cylinder assembly which communicates with the hydrostatic steering unit; and a reservoir disposed above the hydrostatic steering unit and having an outer casing which breathes air at its upper end and communicates by way of an outlet at its lower end with the inlet of the engine-driven pump, and an inner casing for retaining oil for emergency operation which is connected by way of a port at its lower end in reversible flow communication with a port of said unit and communicates by way of an outlet at its upper end with the interior of the outer casing.

7. A power steering system according to claim 6, wherein an oil filter is disposed between the outlet of the inner casing and the interior of the outer casing.

8. A power steering system according to claim 6 or claim 7, wherein the outer casing breathes solid-particle-free air by communicating at its upper end with the outlet pipe of the engine's crankcase breather.

* * * * *